Dec. 19, 1961  K. HILS ET AL  3,013,447
ECCENTRIC DRIVE TRANSMISSION MECHANISM
Filed Feb. 20, 1961  5 Sheets-Sheet 1

INVENTORS
Karl Hils & Hans
Joachim Schwerdhöfer
By Richard Low
Agt

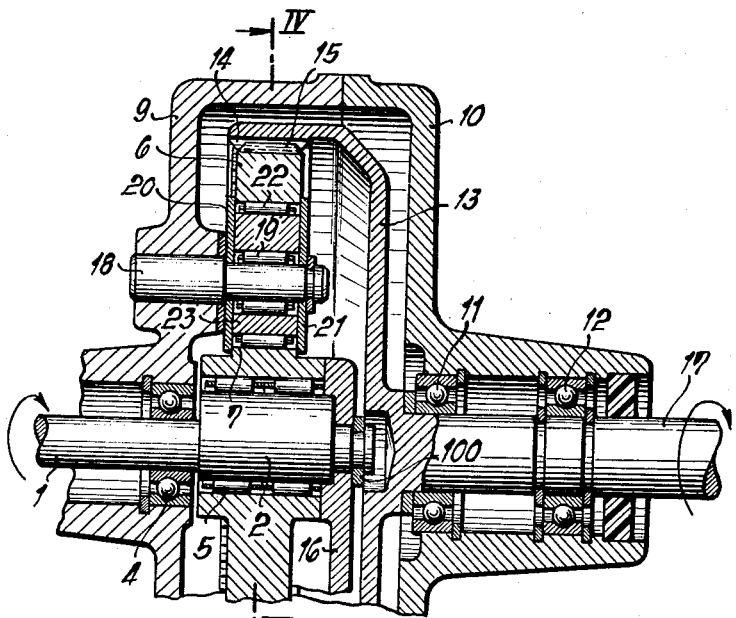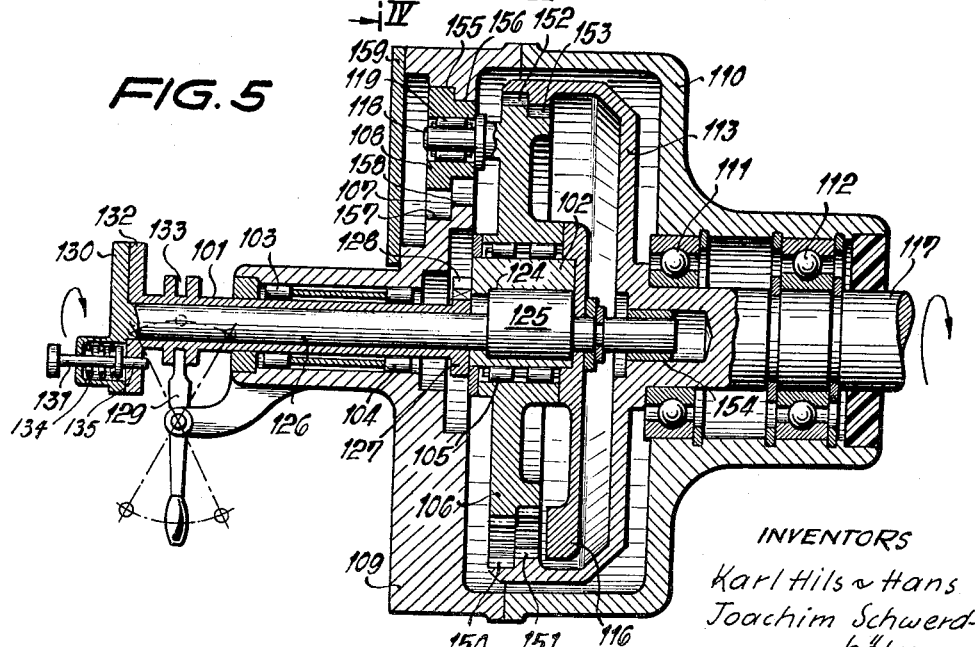

United States Patent Office 3,013,447
Patented Dec. 19, 1961

3,013,447
ECCENTRIC DRIVE TRANSMISSION
MECHANISM
Karl Hils and Hans Joachim Schwerdhöfer, Schweinfurt (Main), Germany, assignors to Fichtel & Sachs A.G., Schweinfurt (Main), Germany, a corporation of Germany
Filed Feb. 20, 1961, Ser. No. 90,413
Claims priority, application Germany Feb. 23, 1960
8 Claims. (Cl. 74—805)

This invention relates to eccentric drive transmission mechanisms of the hypocyclic and pericyclic type in which a rolling planetary wheel having its axis eccentrically located with respect to the common axis of the driving and driven shafts is in driving engagement with another wheel mounted on one of the shafts for rotation about the common axis.

A drive transmission mechanism of the aforedescribed type has been disclosed in our copending application Serial No. 22,044, filed on April 13, 1960, for a Drive Mechanism which includes coupling means for preventing rotation of the eccentrically mounted wheel about its own central axis while permitting gyration of that axis about the common axis of the driving and driven shafts. The coupling means connect the eccentrically mounted wheel to the stationary housing of the drive mechanism.

Such drive transmission mechanisms permit a very high transmission ratio to be established between the driven and driving shaft, the latter moving either faster or slower than the former, but the maximum transmission ratio that can be attained is limited by friction within the mechanism. We have found that friction within the coupling means of hitherto known mechanisms contributes significantly to the overall friction losses in the mechanism.

High friction in the coupling means not only reduces the efficiency of the mechanism, and limits the maximum transmission ratio available, but it also causes relatively rapid wear in the several elements of the coupling means which are in frictional engagement with each other. Some known coupling arrangements involve relative linear sliding motion of cooperating members under relatively high contact pressures which make the use of antifriction bearings inadvisable. Other known devices avoid linear sliding engagement by the use of pivotally connected linkages the elements of which angularly reciprocate relative to each other. The latter type of coupling means rely on a plurality of serially arranged hinge elements which are subject to wear and require relatively much space.

It is the primary object of this invention to improve the eccentric drive transmission mechanisms of the aforedescribed type to increase their efficiency and reduce friction losses.

Another object is the provision of such mechanisms the coupling means of which are relatively immune to wear.

An important object is the provision of coupling means which permit very high transmission ratios between the driven and the driving shafts of the mechanism.

An additional object is the elimination or reduction of the noise level produced by the mechanism by avoiding relative reciprocating movement of mechanism elements during normal torque transmitting operation thereof.

Yet another object is the reduction of the overall dimensions of mechanisms of the aforedescribed type.

With these and other objects in view, the invention contemplates the use of coupling means including two elements respectively arranged on the transmission housing and on the eccentrically mounted wheel. One of the elements is rotatable about a fixed axis and has a contact face radially spaced from the fixed axis which defines a circular path when the element rotates about its axis. This element constitutes guide means and cooperates with the second element which constitutes abutting means and abuttingly engages the contact face of the guide means along the circular path thereof.

Other features of the invention as well as the advantages thereof will hereinafter become more fully apparent from the following description of the annexed drawings, which illustrate preferred embodiments, and wherein:

FIG. 3 is a fragmentary axially sectional view of a hypocyclic drive transmission mechanism provided with a second embodiment of the coupling means of the invention;

FIG. 5 shows a hypocyclic multiple-speed drive transmission mechanism having coupling means of the invention, the view being in axial section;

Figure 1:
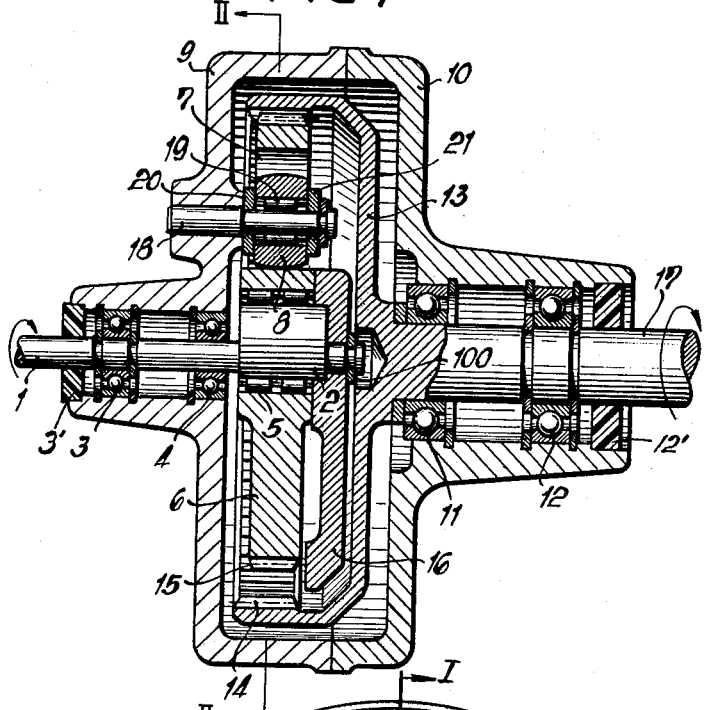
FIG. 1 shows a hypocyclic eccentric drive transmission mechanism equipped with a first embodiment of the coupling means of the invention in axial section on the line I—I of FIG. 2.
Figure 2:
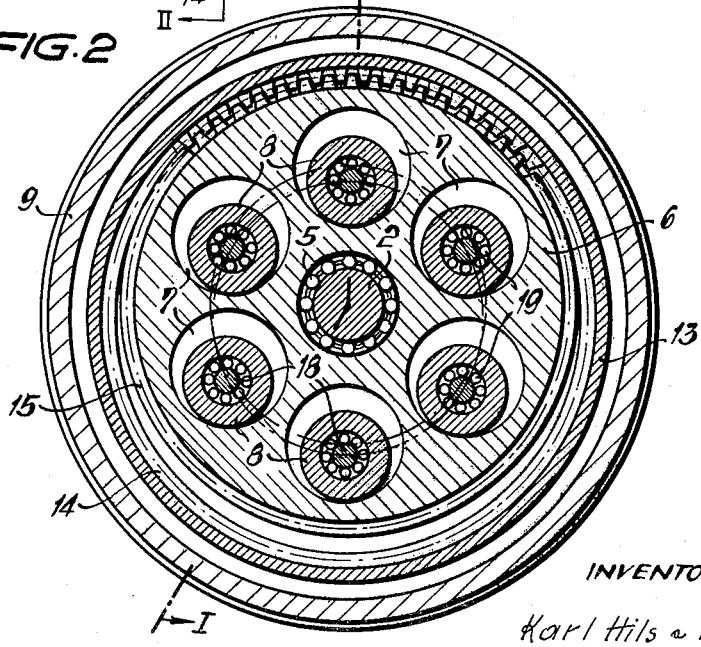
FIG. 2 illustrates the apparatus of FIG. 1 in radial section on the line II—II.

Referring now to the drawings in detail, and initially to FIGS. 1 and 2, there is seen a transmission mechanism which transforms rotation of a driven or input shaft 1 into rotation of a coaxial driving or output shaft 17 at lower speed. The mechanism is contained in a two-part casing the two elements of which will be referred to as the housing 9 and the cover 10. Each of the elements has a hollow hub portion. The driven shaft 1 is journaled in the hub portion of the housing 9 by means of two axially spaced ball bearings 3 and 4. The driving shaft 17 is correspondingly journaled in the hub portion of the cover 10 by means of ball bearings 11 and 12. Oil seals 3' and 12' respectively interposed between the shafts 1, 17 and the hub portions of the casing permit the entire transmission drive mechanism to run in a bath of oil.

The shaft 1 carries a fixedly fastened cylindrical eccentric 2 on the cylinder face of which a gear wheel 6 is rotatably mounted by means of a needle bearing 5. The wheel 6 has an external gear rim 15 which is in meshing engagement with an internal gear rim 14 on a driven wheel 13 which is integral with the output shaft 17. The pitch diameter of the driven wheel 13 is greater by twice the eccentricity of the eccentric 2 than the pitch diameter of the driving gear wheel 6. A balancing mass 16 is mounted on a portion of the shaft 1 extending beyond the wheel 6. It is dimensioned and arranged to balance the radial forces exerted by the eccentric 2 and wheel 6 during rotation of the shaft 1. The balancing mass 16 is held axially in place by a spring washer 100.

Rotation of the wheel 6 about its central axis is prevented by a coupling or compensating arrangement including six rollers 8 of approximately cylindrical barrel shape in rolling engagement with the walls of six circular bores or recesses 7 in the wheel 6 which are uniformly spaced about the central axis of the wheel. Each of the rollers 8 is mounted on a pin 18 fixedly fastened in the housing 9 and rotatable on its pin by means of a needle bearing 19. It is axially secured on the pin between two split washers 20, 21 which engage shoulders on the pin 18. The rollers 8 are made of oil-resistant resilient material such as chloroprene rubber of a hardness permitting flattening of the roller surface under pressure to conform with the shape of the walls of the recesses 7 and to ensure rolling area contact between the rollers and the recess walls regardless of minor manufacturing tolerances. The distance between the center of rotation of each roller 8 on the corresponding pin 18 and the contact face of the roller in engagement with the recess wall is equal to the throw or eccentricity of the eccentric 2.

The gear rims 14, 15 and the contact areas between the rollers 8 and the abutting portions of the recess walls are radially aligned relative to the common axis of the input and output shafts and to the central axis of the wheel 6 which is parallel to the common axis. Canting or tilting of the gear rims under the influence of forces exerted by the rollers 8 on the wheel 6 is thus avoided. The use of needle bearings 5 and 19 further contributes to the stability of the coupling or compensating arrangement.

The mechanism illustrated in FIGS. 1 and 2 operates as follows:

The driven shaft 1 is rotated by a prime mover or the like. Its rotary movement is transmitted by the eccentric 2 and the needle bearing 5 to the driven gear wheel 6. The wheel is prevented from rotating about its central axis by the rollers 8, but it is capable of gyratory translatory movement in engagement with the driven gear wheel 13. The point of engagement travels along the pitch circles of the two gear rims 14, 15 during rotation of the eccentric 2. The wheel 13 is driven at a speed slower than that of the shaft 1. The several rollers 8 guide the wheel 6 in a circular path while they move along the circular circumference of the bores 7. The centers of the bores 8 move in circles about the axes of the corresponding pins 18. The radius of each of these circles is equal to the eccentricity of the eccentric 2.

The coupling or compensating arrangement which includes the guiding rollers 8 and the walls of the bores 7 against which the rollers abut, absorbs the reactive stresses generated by engagement of the wheels 6 and 13. The stresses are transmitted from the abutting wall faces in the bores 7 to the rollers 8, the needle bearings 19, the pins 18, and ultimately to the housing 9. The rollers 8 are in rolling contact with the walls of the bores 7 and slowly rotate during rotation of the shaft 1. In order to avoid undesirable stress concentrations in the mechanism we prefer to provide at least three bores 7 with corresponding rollers 8. They may be arranged symmetrically about the axis of the wheel 6, but if not symmetrical, they should be angularly spaced from each other by angles of less than 180°.

Figure 4:
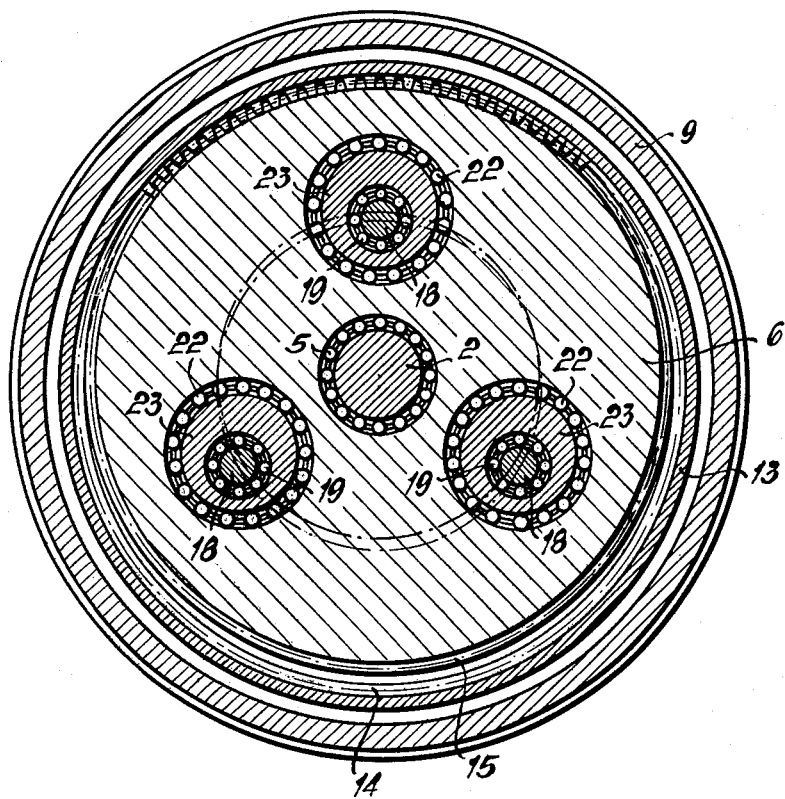
FIG. 4 is a radially sectional view of the apparatus of FIG. 3 taken on the line IV—IV.

The drive transmission mechanism illustrated in FIGS. 3 and 4 in axial and radial section respectively differs from that shown in FIGS. 1 and 2 primarily in the coupling or compensating arrangement, and identical or corresponding elements are being referred to by the same reference numerals. As best seen from FIG. 4, the second embodiment of the invention provides for three axial bores or recesses 7 in the driving gear wheel 6 which are angularly offset relative to each other by 120°. A cylindrical roller 23 is journaled in each of the three recesses by means of a needle bearing 22. Each roller has an eccentric opening which is engaged by a pin 18. A needle bearing 19 is interposed between each pin 18 and the corresponding roller.

The gear rims 14, 15, and the needle bearings 19 and 22 are radially aligned with respect to the common axis of the shafts 1 and 17, so that all radial forces act in a common plane, and tilting or canting of the gear rims 14, 15 and of the needle bearings 19 and 22 is safely avoided. The eccentricity of the openings in the rollers 23 is equal to that of the eccentric 2.

The mode of operation of the apparatus shown in FIGS. 3 and 4 is generally the same as that of the aforedescribed drive transmission mechanism seen in FIGS. 1 and 2. During rotation of the shaft 1, the rollers 23 rotate in the bores 7 of the driving wheel 6 about the respective axes of the bores. They simultaneously rotate about the axes of the corresponding pins 18, thus leading the center of each bore 7 in a circular path about the axis of the corresponding pin 18. The radius of this circular path is equal to the eccentricity of the roller 23, and thus of the eccentric 2.

A single bore 7 and a single eccentric roller 23 would uniquely determine the required gyratory movement of the wheel 6. For the sake of more favorable stress distribution we prefer to employ at least three bores 7 and three corresponding rollers 23 in the bores.

The embodiment of the invention illustrated in FIGS. 3 and 4 is preferred where a relatively high torque is to be transmitted by the eccentric drive transmission mechanism of this invention. The reactive stresses generated are distributed by needle bearings over relatively large areas and concentration of stresses along lines of contact is avoided.

FIG. 5 shows the application of a coupling or compensating arrangement of the invention to a multiple-speed hypocyclic drive transmission mechanism similar in many respects to those shown in the preceding figures.

The mechanism is enclosed in a casing consisting of a housing 109 and a cover 110 each having a hub portion. An output shaft 117 is journaled in the hub portion of the cover 110 by means of ball bearings 111 and 112. The shaft 117 is integral with a driven gear wheel 113 which is equipped with two axially juxtaposed coaxial internal gear rims 150 and 151 of different pitch diameter which jointly constitute a stepped gear face on the wheel 113.

The wheel 113 meshes with a driving gear wheel 106 which is equipped with two coaxial external gear rims 152, 153 of different pitch diameter which are axially spaced so as to form a stepped gear face on the wheel 106 corresponding to the stepped face on the cooperating wheel 113. The wheel 106 is journaled on an eccentrically bored sleeve 102 by means of a needle bearing 105. The eccentric bore 124 of the sleeve 102 engages an adjusting eccentric 125 which is integral with or otherwise fixedly fastened to a control shaft 126. The control shaft 126 is rotatably contained in an axial bore of a hollow input shaft 101. A terminal portion of the control shaft 126 is journalled in a sleeve bearing 154 provided in an axial recess of the output shaft 117.

A balancing mass 116 is carried by the eccentric sleeve 102 and the control shaft 126. The hollow driven shaft 101 has a flange 127 mounted thereon adjacent the eccentric sleeve 102. The peripheral portion of the flange 127 is notched, and the notches are engaged by claw shaped axial projections 128 of the eccentric sleeve 102.

The hollow driven shaft 101 is journaled in the hub portion of the housing 109 by means of needle bearings 103, 104. The control shaft 126 projects outward from the driven shaft 101, and the projecting portion carries a disc shaped flange 130 which axially abuts against an annular flange 132 on the hollow shaft 101, and constitutes a pulley therewith by means of which the shaft 101 may be rotated. The flanges 130 and 132 may be secured against rotation relative to each other in a plurality of angular positions by means of a pin 131. The pin is axially slidable on the flange 130 and is urged into engagement with one of a plurality of circumferentially spaced recesses 135 in the flange 132 by a helical spring 134. Only one of the recesses 135 is visible in FIG. 5.

The portion of the hollow shaft 101 which projects from the hub portion of the housing 109 is provided with two collars which jointly define a circumferential groove 133. Terminal portions of a forked control lever 129 enter the groove 133. The lever 129 is pivoted on the housing 109 and its free end is equipped with a handle.

The driving wheel 106 carries at least three axially projecting eccentric pins 118 of which but one is seen in FIG. 5. A roller 108 is rotatable on each pin 118. A needle bearing 119 is interposed between each pin 118 and the corresponding roller 108. Each roller has two concentric cylindrical contact faces 155, 156 which are axially contiguous, but of different diameter. They form a stepped contact face on the roller 108 which engages a corresponding stepped abutment face of a bore 107 in the housing 109. The difference in diameter between the two abutment faces 157 and 158 of the housing 109 in the bore 107 is equal to the difference in pitch diameter of the rims 150 and 151 of the wheel 113. To avoid oil leakage outward through the needle bearing 119, a closure plate 159 seals the portion of the housing 109 in which the bore 107 is formed.

When the apparatus illustrated in FIG. 5 is operated by rotation of the input shaft 101, the control shaft 126 rotates jointly with the input shaft 101. The driven wheel 113 and the driving wheel 106 are in simultaneous engagement by both pairs of gear rims 150, 151, and 152, 153. Both contact faces 155, 156 of the rollers 108 are in simultaneous abutting engagement with the two abutment faces 157 and 158 of the bore 107.

When it is desired to operate the mechanism at a lower transmission ratio, the forked control lever 129 is pivoted counterclockwise as viewed in FIG. 5. The hollow shaft 101 and the control shaft 126 are thereby axially shifted toward the left and take the eccentric sleeve 102, the adjusting eccentric 125, and the wheel 106 along. This axial movement is continued until the gear rim 153 of the driving wheel 106 is radially aligned with the gear rim 150 of the driven wheel 113.

The rollers 108 partake of the axial movement of the wheel 106 and are moved toward the left until the contact face 156 of the roller is radially aligned with the abutment face 157. By an appropriate change in the eccentricity of the sleeve 102 the gear rim 150 of the driven wheel 113 is then engaged with the gear rim 153 of the driving wheel 106. The contact face 156 of the roller 108 simultaneously engages the abutment face 157 of the stepped bore 107.

The eccentricity of the sleeve 102 is adjusted by relative rotary movement of the hollow shaft 101 and the control shaft 126 which changes the relative angular position of the sleeve 202 and of the adjusting eccentric 125. When the desired change of eccentricity is achieved, the shafts 101 and 126 are secured in the adjusted position by fastening the flanges 130 and 132 to one another by means of the pin 131.

When the apparatus shown in FIG. 5 is to be shifted to a position of increased transmission ratio, that is, of further reduced speed of the output shaft 117 relative to the input shaft 101, the afore-described steps are performed in inverted order and direction. The eccentricity of the sleeve 102 is first reduced until the gear rim 152 of the eccentric wheel 106 can be shifted toward the right, as seen in FIG. 5, into engagement with the gear rim 151 of the driven wheel 113 by clockwise movement of the forked lever 129. The contact face 155 of the roller 108 is simultaneously engaged with the abutment face 158 of the stepped bore 107.

Figure 6:
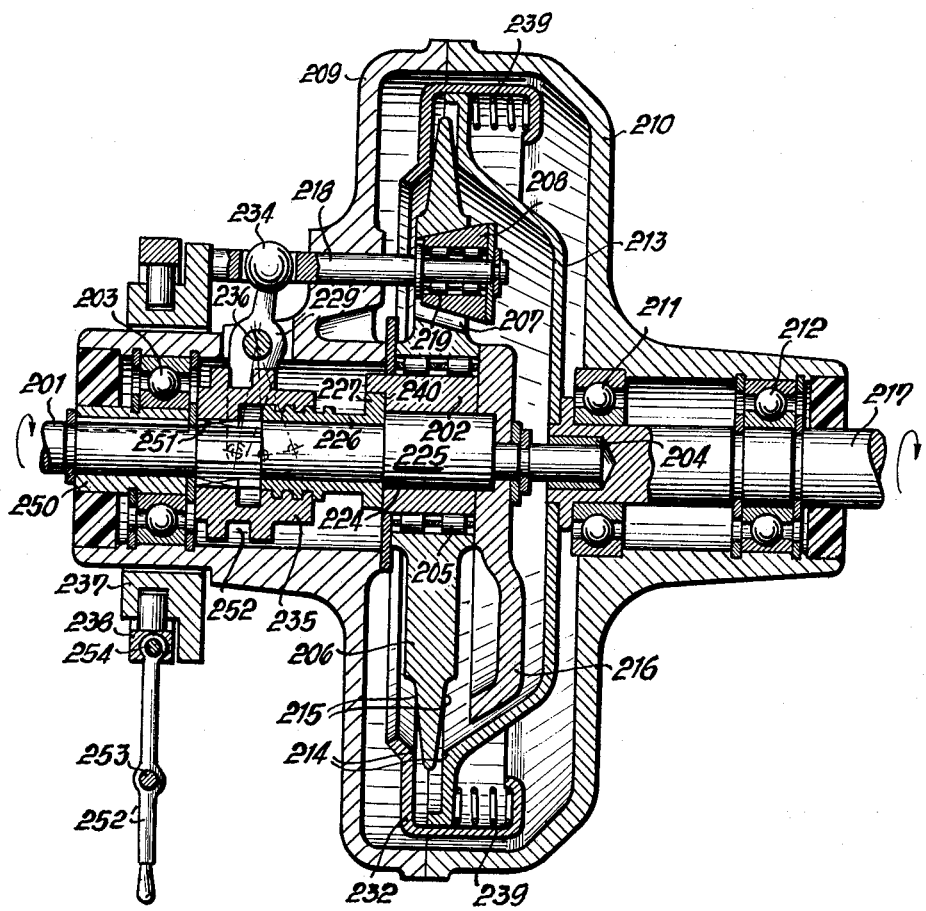
FIG. 6 illustrates a steplessly variable speed drive transmission mechanism of hypocyclic type in a view corresponding to that of FIG. 5.

FIG. 6 shows an axially sectional view of a steplessly variable speed transmission mechanism equipped with the coupling or compensating means of the invention. The casing of the mechanism consists of a housing 209 and a cover 210. A driven, or output shaft 217 is rotatable in ball bearings 211 and 212 arranged in the hub portion of the cover 210, and a driven wheel 213 is fixedly fastened on the shaft 217. The wheel 213 is dish shaped and has a flat rim. A backing ring 232 envelops the rim of the wheel 213 and is axially slidable thereon. The ring 232 has a flat rim portion opposite the flat rim of the wheel 213 and is urged axially toward the rim of the wheel 213 by a plurality of circumferentially uniformly spaced helical springs 239 of which only two are visible in FIG. 6.

A driving wheel 206 has a rim portion bounded by two conical friction faces 215 which respectively engage the flat rim portion of the backing ring 232 and the flat rim of the wheel 213 under the urging of the springs 239. The wheel 206 is journaled on an eccentric sleeve 202 by means of a needle bearing 205. The eccentric bore 224 of the sleeve 202 rotatably receives an adjusting eccentric 225 which is fixedly mounted on a drive shaft 201 and carries a balancing mass 216. The drive shaft 201 has a terminal portion in the mechanism casing which is journaled in a sleeve bearing 204 provided in an axial recess of the output shaft 217. A sleeve 250 is secured on the shaft 201 against rotation and is journaled in a hub portion of the housing 209 by means of a ball bearing 203.

A hollow control shaft 226 is rotatable on the input shaft 201. The control shaft is provided with a radial projection 227 which engages an eccentric recess 240 of the eccentric sleeve 202, thus coupling the sleeve to the control shaft for joint rotation. The control shaft 226 is equipped with a steeply pitched external thread which engages a corresponding internal thread of an actuating sleeve 235. The sleeve 235 is keyed to the driven shaft 201 by keys 251 which permit axial movement of the sleeve but prevent its rotation relative to the shaft. A terminal portion of a forked actuating lever 229 engages an annular groove 252 of the sleeve 235. The lever 229 is rotatable on a pivot pin 236 which is fastened to the housing 209. A spherically enlarged arm 234 of the lever 229 engages an aperture in the pin 218 which is longitudinally slidable in the wall of the housing 209. A terminal portion of the pin 218 outside the housing 209 is fastened to a control sleeve 237. It will be understood that the apparatus shown in FIG. 6 is equipped with at least two additional pins similar to pin 218, and each having a terminal portion fastened to the control sleeve 237 and movable therewith in a direction into and out of the housing 209 when the lever 229 actuates movement of the pin 218.

The pin 218 and the other pins (not illustrated) which move longitudinally with the sleeve 237 carry each within the housing 209 a needle bearing 219 and a roller 208 rotatable on the needle bearing. The rollers 208 are each of frustoconical shape and engage a corresponding conically shaped bore 207 of the wheel 206 to prevent rotation of the latter about its central axis, while permitting gyration thereof. The diameter of the bore 207 is greater than that of the axially corresponding portion of the roller 208.

The control sleeve 237 is axially slidable on the hub portion of the housing 209. Its axial movement is actuated by a control lever 252' which is pivoted to an extension (not shown) of the housing 209 by a pin 253. The lever 252' is hingedly fastened to a ring 238 by a pin 254, and the ring engages a peripheral groove of the sleeve 237.

When the input shaft 201 is rotated, the control shaft 226 and the eccentric sleeve 202 rotate with it. The conical contact faces of the rollers 208 roll along the conical abutment faces of the bores 207. The conical friction faces 215 are in rolling engagement with the wheel 213 and the backing ring 232, the point of engagement traveling along the circumferences of the engaging members in the manner described above. The general mode of operation of the mechanism is largely identical with that of the apparatus discussed in detail in connection with the description of FIGS. 1 and 2.

When the transmission ratio of the mechanism is to be altered, the eccentricity of the sleeve 202 is changed. The lever 252' is pivoted on the pin 253, and the control sleeve 237, the pin 218, the lever arm 234, the forked actuating lever 229, and the actuating sleeve 235 are moved axially without rotation relative to the driven shaft 201. The threaded engagement of the actuating sleeve 235 with the control shaft 226 causes the latter to turn relative to the shaft 201, and the rotation of the control shaft 226 causes the eccentric sleeve 202 to turn due to the engagement of the radial projection 227 with the eccentric recess 240 of the eccentric sleeve 202. The angular position of the eccentric sleeve 202 relative to the adjusting eccentric 225 is thus altered and the eccentricity of the axis of the wheel 206 is changed.

The change in the eccentricity of the sleeve 202 is accompanied by axial movement of the rollers 208 in the bores 207. The dimensions of the several elements of the coupling or compensating arrangement are selected in such a manner that the contact faces of the rollers 208 abut against the abutment faces in the bores 207 after the eccentricity of the sleeve 202 has been adjusted.

Figure 7:
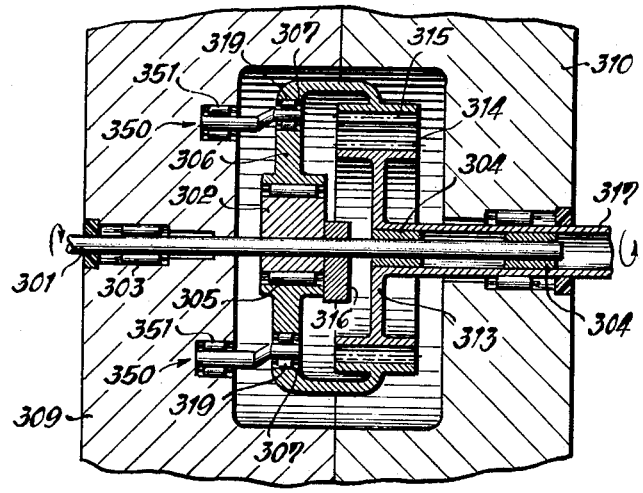
FIG. 7 shows a pericyclic eccentric drive transmission mechanism equipped with an additional embodiment of the coupling means of this invention.

The several embodiments of the compensating coupling arrangement of the invention may be equally applied to planetary gear arrangements of a type other than the hypocyclic gear trains so far discussed. A pericyclic drive transmission mechanism is illustrated in FIG. 7. It includes a housing 309 which cooperates with a cover 310 to enclose the movable members of the mechanism. Torque is transmitted from an input shaft 301 to an output shaft 317. The driven or input shaft 301 is journaled in a needle bearing 303 in the housing 309, and in a sleeve bearing 304 in the central cavity of the hollow driving or output shaft 317. An eccentric 302 is secured on the input shaft 301 against rotation. A peripheral needle bearing 305 on the eccentric 302 supports a driving wheel 306. The wheel is equipped with an internal gear rim 315 which meshes with an external gear rim 314 of a driven wheel 313 which is coaxially mounted on the output shaft 317.

A balancing mass 316 is mounted on the input shaft 301.

Four overhung cranks 350 connect the housing 309 with the driving wheel 306, but two only are seen in FIG. 7. One of the two radially offset terminal axial portions of each crank 350 is journaled in the housing 309 in a needle bearing 351. The other terminal axial portion of each crank 350 is journaled in a needle bearing 319 in a bore 307 of the driving wheel 306. The throw of the cranks 350 is equal to the eccentricity of the eccentric 302. The cranks 350 thus guide the wheel 306 in a circular path while preventing rotation thereof about its own central axis. The center of each bore 307 rotates about the axis of a corresponding needle bearing 351 in a circle the radius of which is equal to the eccentricity of the eccentric 302.

The mode of operation of the apparatus of FIG. 7 will be apparent to those skilled in the art from the preceding explanation of the devices of FIGS. 1 to 6.

It is a common feature of all embodiments of our invention that the elements of the coupling or compensating means which prevent rotation of the eccentric wheels 6, 106, 206, 306 about their respective axes while permitting the axes to gyrate about the common axis of the input and output shafts of the mechanism are in rolling or rotary contact only during torque transmitting operation of the mechanism. Where rotary contact involves the transmission of forces, anti-friction bearings, and preferably needle bearings are employed in a manner not available wtih devices relying on relative linear sliding movement of cooperating parts or on angular reciprocating movement of multi-member linkages.

The coupling or compensating arrangements of the invention thus permit higher transmission ratios to be achieved with the drive transmission mechanisms of the type with which this invention is more particularly concerned than has herebefore been possible. Our invention generally increases the mechanical efficiency of transmission mechanisms of the type discussed and increases their useful life by reducing wear on critical parts. The avoidance of reciprocating movement of mechanism elements during torque transmitting operation reduces the noise level and thus eliminates a serious obstacle to the more widespread application of these drive transmisison mechanisms. The coupling or compensating device is entirely contained within the perimeter of the wheels of the transmission train and do not significantly increase the space requirements for the mechanism.

Various modifications are contemplated and may obviously be resorted to by those skilled in the art without departing from the spirit and scope of the invention as hereinafter defined in the appended claims, as only preferred embodiments thereof have been disclosed.

What we claim is:

1. In an eccentric drive transmission mechanism, in combination, a housing member; coaxial driving and driven shafts rotatably supported in said housing member; eccentric means on one of said shafts; a wheel member rotatable on said eccentric means about a central axis radially spaced from the common axis of said shafts, said wheel member having a plurality of coaxial annular engaging faces of different diameter; eccentric adjusting means for varying the radial spacing of said central axis from said common axis; centrally mounted wheel means coupled with the other one of said shafts for joint rotation about said common axis, said wheel means having a plurality of coaxial annular engaging faces of different diameter about said common axis, respective ones of said engaging faces being in driving engagement; guide means rotatable about a fixed axis on one of said members and having a plurality of contact faces each differently radially spaced from said fixed axis, said contact faces each defining a circular path when said guide means rotate about said fixed axis; and abutting means on the other one of said members for abutting engagement with a selected one of said contact faces along the circular path thereof.

2. In a mechanism as set forth in claim 1, the engaging faces of said wheel member and the engaging faces of said wheel means being respectively axially spaced to form respective stepped faces, said contact faces being stepped and said abutting means including a plurality of axially spaced stepped abutting faces, said mechanism further comprising means for axially shifting said wheel means relative to said wheel member, and for shifting said guide means relative to said abutting means for engagement of selected ones of said engaging faces and for engagement of a selected contact face with a selected one of said abutting faces.

3. In a mechanism as set forth in claim 2, said guide means being mounted on said wheel member, and said abutting means being on said housing member.

4. In an eccentric drive mechanism, in combination, a housing member; coaxial driving and driven shafts rotatably supported in said housing member; eccentric means on one of said shafts; a wheel member rotatable on said eccentric means about a central axis radially spaced from the common axis of said shafts, said wheel member having a conical engaging face; eccentric adjusting means for varying the radial spacing of said central axis from said common axis; centrally mounted wheel means coupled with the other one of said shafts for joint rotation about said common axis, said wheel means having a conical engaging face about said common axis, said engaging faces being in driving engagement; shifting means for axially shifting said wheel means relative to said wheel member; guide means rotatable about a fixed axis on one of said members and having a conical contact face radially spaced from said fixed axis, said contact face defining a circular path when said guide means rotate about said fixed axis; conically shaped abutting means on the other one of said members for abutting engagement with said contact face along said circular path; and control means for controlling the relative axial position of said guide means and of said abutting means.

5. In a mechanism as set forth in claim 4, coupling means connecting said eccentric adjusting means and said control means for actuation of relative axial movement of said guide means and said abutting means when the radial spacing of said central axis and of said common axis is varied.

6. In a mechanism as set forth in claim 5, said coupling means including two threadedly engaged members respectively connected to said control means and said eccentric adjusting means.

7. In an eccentric drive transmission mechanism, in combination, a housing member; coaxial driving and driven shafts rotatably supported in said housing member; eccentric means on one of said shafts; a wheel member rotatable on said eccentric means about a central axis radially spaced a predetermined distance from the common axis of said shafts, said wheel member being formed with an axially extending recess and having a wall portion of circular cross section in said recess, said wheel member having an annular engaging face; centrally mounted wheel means coupled with the other one of said shafts for joint rotation about said common axis, said wheel means having an annular engaging face about said common axis, said engaging faces being in driving engagement; and guide means rotatable about a fixed axis on said housing member and having a contact face radially spaced from said fixed axis, said contact face defining a circular path when said guide means rotate about said fixed axis, said wall portion being in abutting engagement with said contact face along said circular path, said guide means including a rotary member journaled in said recess and formed with an eccentric bore, and pin means on said housing member rotatably engaging said bore, the eccentricity of said bore being equal to said predetermined distance.

8. In an eccentric drive transmission mechanism, in combination, a housing member; coaxial driving and driven shafts rotatably supported in said housing member; eccentric means on one of said shafts; a wheel member rotatable on said eccentric means about a central axis radially spaced a predetermined distance from the common axis of said shafts, said wheel member being formed with an axially extending recess and having a wall portion of circular cross section in said recess, said wheel member having an annular engaging face; centrally mounted wheel means coupled with the other one of said shafts for joint rotation about said common axis, said wheel means having an annular engaging face about said common axis, said engaging faces being in driving engagement; and guide means rotatable about a fixed axis on said housing member and having a contact face radially spaced from said fixed axis, said contact face defining a circular path when said guide means rotate about said fixed axis, said wall portion being in abutting engagement with said contact face along said circular path, said guide means including a roller member of resilient material, said roller member having a contact face of substantially circular cross section when relaxed, and substantially conforming to said wall portion when in abutting engagement therewith, the internal radius of said wall portion being greater than the radius of the relaxed contact face by less than said predetermined distance.

References Cited in the file of this patent

UNITED STATES PATENTS

| | | |
|---|---|---|
| 2,508,121 | McIver | May 16, 1950 |
| 2,609,713 | Martin et al. | Sept. 9, 1952 |

FOREIGN PATENTS

| | | |
|---|---|---|
| 679,410 | France | Jan. 9, 1930 |
| 636,640 | Great Britain | May 3, 1950 |
| 1,042,572 | France | June 10, 1953 |
| 557,176 | Italy | Feb. 13, 1957 |